US006691162B1

United States Patent
Wick

(10) Patent No.: US 6,691,162 B1
(45) Date of Patent: Feb. 10, 2004

(54) MONITORING USERS OF A COMPUTER NETWORK

(75) Inventor: Andrew L. Wick, Fairfax, VA (US)

(73) Assignee: America Online, Inc., Dulles, VA (US)

( * ) Notice: Subject to any disclaimer, the term of this patent is extended or adjusted under 35 U.S.C. 154(b) by 0 days.

(21) Appl. No.: 09/399,750

(22) Filed: Sep. 21, 1999

(51) Int. Cl.$^7$ .................................................. G06F 15/173
(52) U.S. Cl. ........................ 709/224; 709/206; 709/207
(58) Field of Search ................................ 709/224, 206, 709/207

(56) References Cited

U.S. PATENT DOCUMENTS

| | | | | |
|---|---|---|---|---|
| 5,063,523 A | * | 11/1991 | Vrenjak | 709/223 |
| 5,828,839 A | * | 10/1998 | Moncreiff | 709/204 |
| 5,943,478 A | * | 8/1999 | Aggarwal et al. | 709/229 |
| 5,990,887 A | * | 11/1999 | Redpath et al. | 345/758 |
| 6,055,570 A | * | 4/2000 | Nielsen | 709/224 |
| 6,148,328 A | * | 11/2000 | Cuomo et al. | 345/753 |
| 6,260,148 B1 | * | 7/2001 | Aggarwal et al. | 713/201 |
| 6,301,609 B1 | * | 10/2001 | Aravamudan et al. | 709/207 |
| 6,339,784 B1 | * | 1/2002 | Morris et al. | 345/758 |
| 6,366,962 B1 | * | 4/2002 | Teibel | 709/203 |

FOREIGN PATENT DOCUMENTS

WO    WO 98/16045    *    4/1998

OTHER PUBLICATIONS

ICQ: "ICQ 99a, Online help"; Copyright 1998, ICQ Inc. XP002163918.*
Eschenburg A: "Wo laufen sie denn? ICQ Haelt Verbindung Zu Bekannten" CT Magazin Fuer Computer Technik, De, Verlag Heinz Heise GMBH., Hanover, No. 22, Oct. 26, 1998, pp. 92–95, XP000779803; ISSN: 0724–8679, p. 92.*

"Mechanism to Facilitate Selective Acknowledgment for Office Mail Services"; IBM Technical Disclosure Bullentin, IBM Corp. New York, US, vol. 36, No. 8, Aug. 1, 1993, p. 225; XP000390204; ISSN: 0018–8689; whole document.*

"Away–Mode Acknowledgement Call back"; IBM Technical Disclosure Bullentin, IBM Corp. New York, US, vol. 37, No. 4A, Apr. 1, 1994, p. 583; XP000446791, ISSN: 0018, 8689, whole document.*

ICQ: "ICQ 99a, Online help"; Copyright 1998, ICQ Incorporated XP002163918.

* cited by examiner

Primary Examiner—Ario Etienne
Assistant Examiner—LaShonda Jacobs
(74) Attorney, Agent, or Firm—Fish & Richardson P.C.

(57) ABSTRACT

Communicating with and/or monitoring of a targeted used in computer-network environment (e.g., an instant messaging system) involves detecting that the targeted user has signed on to the network, and upon detecting the signon, automatically communicating with the targeted user, for example, by sending an instant message previously specified by a targeting user. Alternatively, or in addition, the targeting user can receive notification that the targeted user has signed on and/or that the instant message has been sent. Instead of, or in addition to, automatically sending an instant message and/or notifying the targeting user, a predefined operation specified by the targeting user (e.g., operating system command, script or executable file) can be performed. These various operations can be performed on one or more client systems, on one or more server systems, or any combination thereof.

35 Claims, 12 Drawing Sheets

MONITORING USERS OF A COMPUTER NETWORK

TECHNICAL FIELD

This application relates to monitoring users of a computer network, for example, to facilitate messaging between users in an online computer services environment.

BACKGROUND

The computer system 100 illustrated in FIG. 1 represents a typical hardware setup for executing software that allows a user to perform tasks such as communicating with other computer users, accessing various computer resources, and viewing, creating, or otherwise manipulating electronic content—that is, any combination of text, images, movies, music or other sounds, animations, 3D virtual worlds, and links to other objects. The system includes various input/output (I/O) devices (mouse 103, keyboard 105, display 107) and a general purpose computer 100 having a central processor unit (CPU) 121, an I/O unit 117 and a memory 109 that stores data and various programs such as an operating system 111, and one or more application programs 113. The computer system 100 also typically includes some sort of communications card or device 123 (e.g., a modem or network adapter) for exchanging data with a network 127 via a communications link 125 (e.g., a telephone line).

As shown in FIG. 2, a user of a computer system can access electronic content or other resources either stored locally at the user's own client system 202, 202a, or 202b (for example, a personal or laptop computer) or remotely at one or more server systems 200. An example of a server system is a host computer that provides subscribers with online computer services such as e-mail, e-commerce, chat rooms, Internet access, electronic newspapers and magazines, etc.

Users of a host computer's online services typically communicate with one or more central server systems 200 through client software executing on their respective client systems 202, 202a, or 202b. In practice, a server system 200 typically will not be a monolithic entity but rather will be a network of interconnected server computers, possibly physically dispersed from each other, each dedicated to its own set of duties and/or to a particular geographical region. In such a case, the individual servers are interconnected by a network of communication links, in know on fashions. One such server system is "America Online 4.0" from America Online, incorporated of Virginia (also known as "AOL").

One increasingly popular computer network-based activity is referred to as "instant messaging." An instant message is a form of electronic communication between users of a computer network in which a window pops-up on the recipient's computer screen "instantly" and without the recipient's having to access an e-mail program or otherwise check for messages. An instant message appears essentially as soon as the message sender clicks the send button subject to any time or propagation delays the message may have encountered on the network. In comparison to most e-mail applications, instant messaging enables users to communicate with each other in a more dynamic, urgent and interactive manner.

FIG. 3 is a screen shot of an Instant Message (IM) window 30 as used in AOL's Instant Messenger ("AIM") system. As shown therein, the window 30 includes a text display area 31 and text entry area 32. Both users involved in the IM under consideration (i.e., sender and recipient) would have a similar window displayed on his or her computer monitor. When one user (PhillipsJC) types a comment 34 in text entry area 32 and clicks the Send button 33 (or, depending on the configuration, presses the "ENTER" key on the keyboard), the entered text (e.g., "Hey, did you see the game last night?") is displayed in the text display area 31 of the window 30 such that it is visible to both users. After FRsnafu enters a comment 35 in response and clicks the Send button 33, that comment 35 appears in the text display area 31 underneath the previous comment 34. This exchange of comments continues indefinitely until the users decide to terminate the exchange.

Typically, instant messages can be sent to another user only when that user is presently signed on to the computer service. Users who are signed off are unavailable to receive instant messages. Accordingly, another popular innovation introduced by America Online is the "Buddy List," which allows users to monitor when other specified users ("buddies") are signed onto and/or off of the computer service under consideration (e.g., AOL Instant Messenger).

As shown in FIG. 4, the Buddy List is implemented as a window 40 that lists specified users, or buddies, who are signed on to the AIM system. In the example shown, the Buddy List for user "PhillipsJC" indicates that four of PhillipsJC's buddies 41–44 currently are signed on to the system and thus available to receive instant messages. The Buddy List is updated based on information received from a server to add or delete names of buddies as they sign on and off, respectively. Such Buddy List updates can be accompanied by various audible and visual indications to help notify the user that a buddy has signed on or off.

Despite the various notification mechanisms, a user nevertheless may fail to notice that a buddy with whom IM communication is desired has signed on to the system. For example, if the user is on the telephone or away from his or her office, one of that user's buddies may sign on and then off again unnoticed by the user. Alternatively, or in addition, even when a user notices that a buddy has signed on to the system, the user nevertheless may be unable to send the buddy an IM because the user may be otherwise engaged (e.g., in a meeting).

Other reasons exist why a user might not notice that a buddy has signed on and/or miss an opportunity to send an IM to the buddy. For example, the user might have so many buddies on his buddy list that they cannot all fit on the display screen, or in a display window, at the same time. Moreover, the buddy list window might be obscured by other windows or objects and thus the user might not be able to notice when the buddy has signed on. In any of these and possibly other situations, the buddy may sign off of the system before the user is able to send an IM, thus missing the window of opportunity.

Accordingly, the present inventor recognized that it would be desirable to provide users with mechanisms for monitoring signons by buddies and/or communicating with the buddies immediately and automatically upon their signing on to the system.

SUMMARY

Implementations may include various combinations of the following features.

In one aspect, a computer-implemented method of communicating with a user includes detecting that a previously unavailable user is available to receive messages, and automatically sending a predetermined message (e.g., an instant message) to the user upon detecting that the user has become available. Alternatively, or in addition, notification may be provided to a monitoring user that the previously unavailable user has become available and/or that the predetermined message was sent. The method may further include instantiating an instant messaging window on a computer screen of the monitoring user upon detecting that the previously unavailable user has become available. Optionally, the notified monitoring user may have previously specified the predetermined message. Moreover, a command specified by the monitoring user (e.g., an operating system command, a script, or an executable file) may be executed upon detecting the user's availability.

Prior to the detection, a request may have been received from the monitoring user to monitor availability of the previously unavailable user. The received request may be queued until the previously unavailable user becomes available. The automatic sending of the predetermined message may include instantiating a window on the user's computer screen displaying the predetermined message. The operations of detecting and the automatic message sending may be repeated each time the user newly becomes available. Moreover, the detecting and automatic message sending operations may be performed entirely on one or more server systems, entirely on one or more client systems, or in a distributed manner among one or more server systems and one or more client systems.

In another aspect, a computer-implemented instant messaging method may include detecting that a targeted user has signed on to an instant messaging service, and upon detecting the signon, automatically sending to the targeted user an instant message previously specified by a targeting user. The targeting user can receive notification that the targeted user has signed on to the instant messaging service and/or that the instant message was sent.

Automatically sending the instant message may include instantiating a window on the targeted user's computer screen displaying the instant message and/or instantiating an instant messaging window on a computer screen of the targeting user upon detecting that the targeted user has signed on.

Prior to detection, a request may be received from the targeting user to monitor a signon by the targeted user. The received request may be queued until the targeted user signs on. The targeting user also may provide input specifying the instant message.

In another aspect, a computer-implemented method of monitoring users of a computer network may include receiving from a monitoring user a request to monitor availability of a monitored user, detecting that the monitored user is available (e.g., has signed on), and automatically performing a predefined operation specified by the monitoring user (e.g., send an instant message, provide notification to the monitoring user or another entity, or both, and/or execute an operating system command, a script, or an executable file) upon detecting that the monitored user is available.

In another aspect, a computer-implemented method, performed at a server, of communicating with a user on a computer network including a plurality of clients and at least one server, may include receiving a request to detect when a currently unavailable user becomes available to receive messages, detecting that the user has become available, and automatically sending a predetermined message to the user upon detecting that the user has become available.

In another aspect, a computer-implemented method, performed at a client, of communicating with a user on a computer network including a plurality of clients and at least one server, may include generating a request to detect when a currently unavailable user becomes available to receive messages, receiving notice that the user has become available, and automatically sending a predetermined message to the user.

In another aspect, an instant messaging system may include a server system and one or more client systems, each associated with a corresponding user, in communication with the server system. The server system may include software instructions for (i) monitoring a targeted user's availability to receive instant messages, and (ii) sending a notification that a targeted user has become available to receive instant messages. Each of the one or more client systems may include software instructions for (i) queuing a request to send an instant message to a currently unavailable targeted user, and (ii) sending the instant message to the targeted user upon receiving notification from the server system that the targeted user has become available to receive instant messages.

One or more of the following advantages may be provided. The techniques and methods described here enable users to more reliably and efficiently track the comings and goings of their buddies. As a result, the likelihood of a user's being able to communicate (e.g., by instant message) with buddies, even those who sign on to the computer service infrequently or sporadically, is enhanced dramatically.

In addition, communication between users is improved by providing mechanisms to automatically and instantly communicate with buddies upon their signing on to the computer service. The sending user needs neither to be aware of the buddy's signing on, nor be available to send an IM, for this automatic and instant communication to occur. Rather, the sending user needs only to set up the "pounce" and the buddy at whom the pounce is targeted can receive an IM automatically and without requiring the sending user's further attention or authorization.

The details of one or more embodiments are set forth in the accompanying drawings and the description below. Other features, objects, and advantages of the invention will be apparent from the description and drawings, and from the claims.

DRAWING DESCRIPTIONS

Like reference numbers and designations in the various drawings indicate like elements.

DETAILED DESCRIPTION

Figure 5:
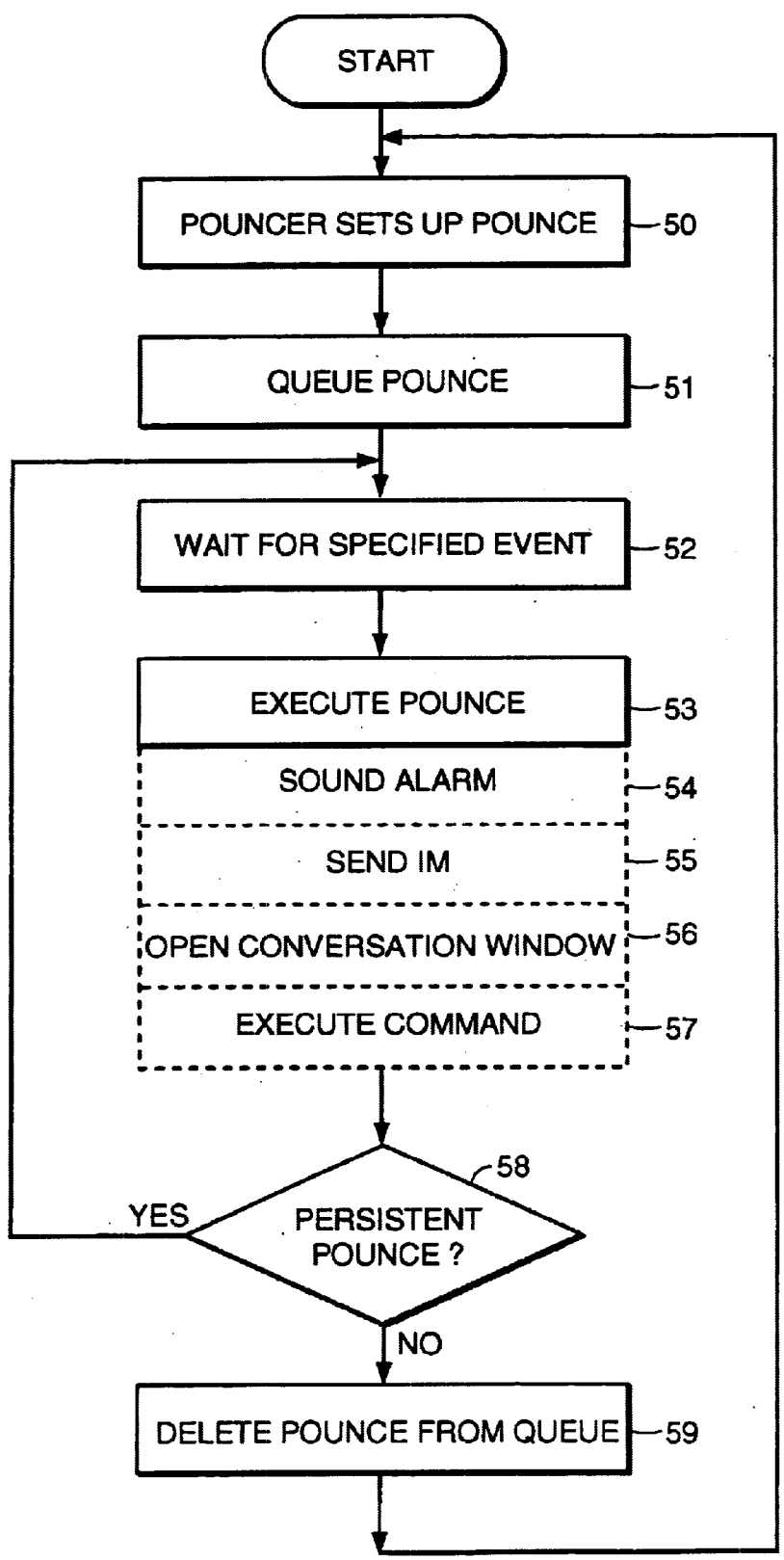
FIG. 5 is a flowchart of pouncing on a user.

FIG. 5 is a flowchart of a process that allows one user to "pounce" on another user (e.g., a buddy) as soon as the buddy signs on to the computer service. "Pounce" refers to the ability to take one or more specified actions (e.g., send a message, emit an audible or visual notification, execute a command, etc.) automatically upon determining that a specified event has occurred, for example, detecting that a buddy has signed on to the computer service.

As shown in FIG. 5, as an initial step in pouncing on another user (the "pouncee" or "targeted user"), a first user (the "pouncer" or "targeting user") sets up the parameters of the pounce (step 50). Although these parameters can vary between implementations, typical parameters that could be specified by the pouncer include the identity of the pouncee (specified by, e.g., signon ID, name, e-mail address, etc.); the event that triggers the pounce (e.g., pouncee's signing on to system, pouncee's sending an IM to a specified party, detection of being added to or deleted from the pouncee's buddy list, etc.); the action or actions that are to be taken (e.g., send an IM; send a chat invitation, audible or visual notification, execute a specified command, or any other arbitrary action); and whether the pounce should occur only once or upon each separate detection of the specified trigger event. The pouncee designated in step 50 can, but need not necessarily, be on the pouncer's Buddy List.

After being set-up by the pouncer, the pounce is queued pending occurrence of the specified event (step 51). In effect, an indication is set at the server that the pouncer's client application is to be notified upon detection of the specified event. The queue can be maintained either locally at the pouncer's client system or remotely at a server system. Either a single pounce or multiple pounces can be in the queue concurrently. In addition, a pounce can be either a single-shot (i.e., executed only once on the first occurrence of the specified event) or persistent (i.e., executed with each occurrence of the specified event).

The next step is to wait for occurrence of the specified event (step 52), for example, a detection that a specified user has signed on to the computer service. This detection can occur either at the client system or in conjunction with a server on the network.

Next, upon occurrence of the specified event, the pounce is executed (step 53). Execution of the pounce can occur at the pouncer's client system or at the pouncee's client system, or both, potentially in conjunction with one or more server systems. The particular actions that can be taken upon execution of the pounce can vary with different implementations, and/or based on user-specified preferences. Typical actions may include one or more of the following: sounding an alarm (step 54); sending an IM (step 55), opening a conversation window on the pouncer's client system (step 56); or executing a user-specified command (step 57), for example, locally on the pouncer's client system. As indicated by dotted lines, each of the actions indicated in steps 54–57 is optional. Moreover, other actions beyond or in addition to those shown in steps 54–57 may be taken.

After the pounce has been executed, it is determined whether or not the pounce is persistent—that is, whether or not the pounce should be executed only once or each time upon detection of the specified event (step 58). If the pounce is persistent, it remains in the queue and the process returns to step 52 to wait for the next specified event. On the other hand, if the pounce is a single-shot, the pounce is removed from the queue (step 59) and the process returns to step 50 to allow the pouncer to set up another pounce, as desired.

A single user can have multiple pounces pending at the same time. The process shown in FIG. 5 generally represents steps that are taken for each individual pounce sequence.

Figure 6:
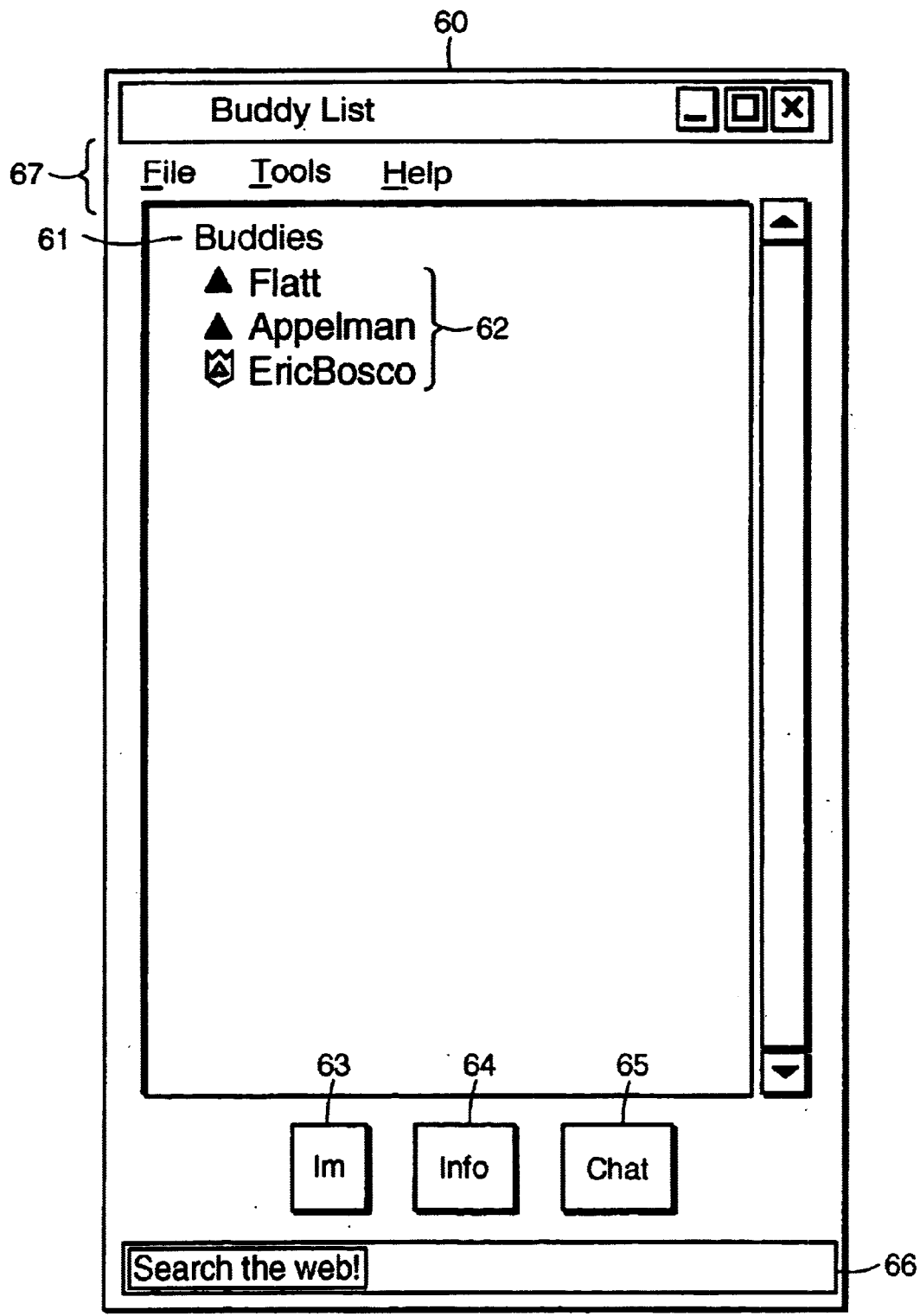
FIG. 6 is a screen shot of a "Buddy List" window in AOL Instant Messenger for Unix.

FIGS. 6–13 are screen shots illustrating an implementation of the pounce concept in a Unix-based version of the AIM application (referred to as "TiK"). FIG. 6 shows a TiK Buddy List window 60 for user "FRsnafu" displaying a list 61 of three of FRsnafu's buddies 62 currently signed on to the AIM system. The Buddy List window 60 also includes a menu bar 67 listing three drop-down menus (File, Tools, Help), a text area 66 for entering text strings for web searches, an IM button 63 for instantiating an IM window to send an IM to another user, an Info button 64 for retrieving information about another user, and a Chat button 65 for instantiating a Chat window to invite another user to participate in a chat session.

As noted above, the Buddy List window 60 in FIG. 6 indicates that three of FRsnafu's buddies 62 currently are signed on to AIM. However, in this example, user FRsnafu desires to send an IM to another buddy, "PhillipsJC," who is not currently signed on to the AIM system. Accordingly, FRsnafu, the pouncer in this example, decides to set up a pounce to receive notification, and to send PhillipsJC an IM, as soon as PhillipsJC signs on to AIM.

Figure 7:
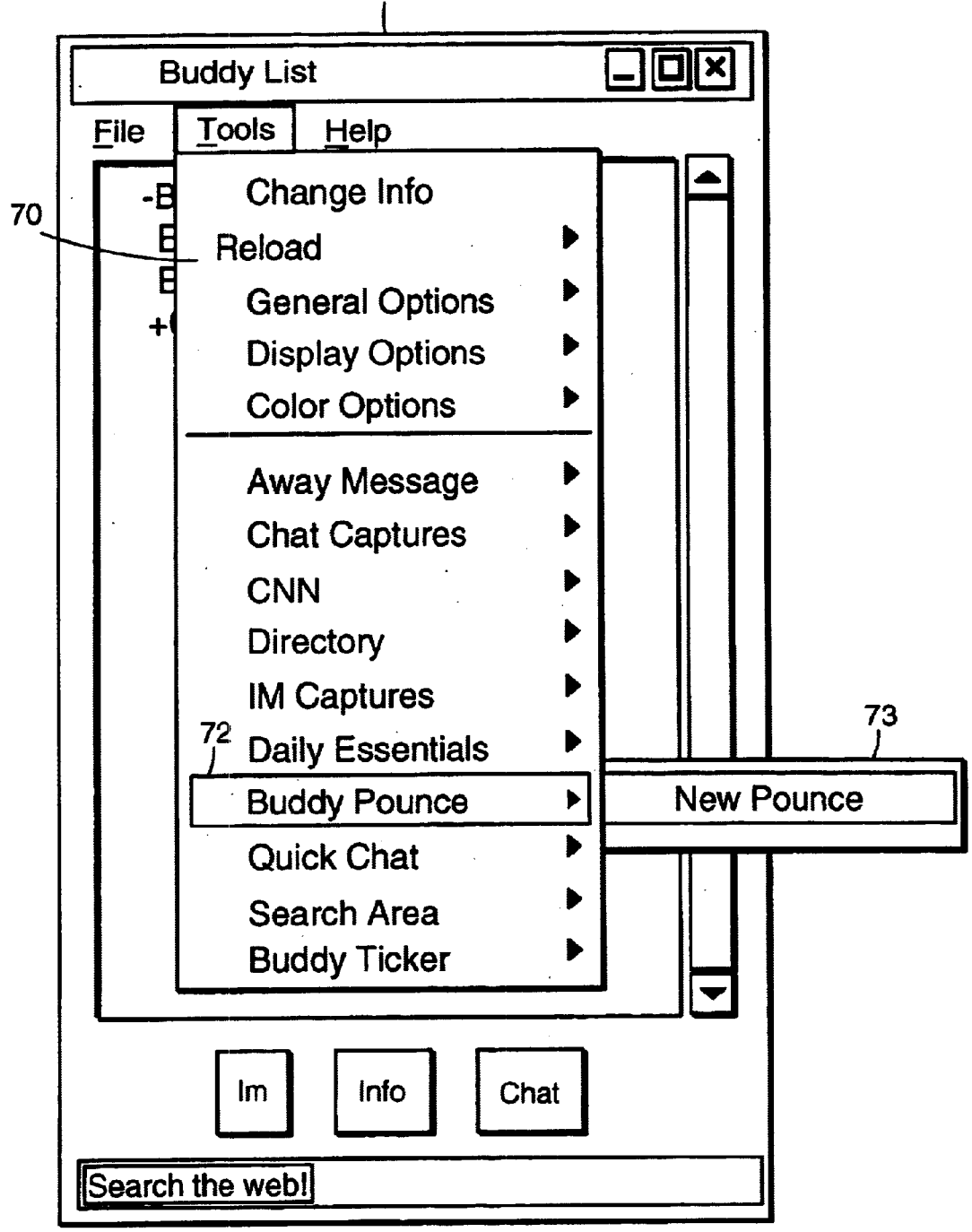
FIG. 7 is a screen shot of a "Tools" pull-down menu in the Buddy List window of FIG. 6.

FIG. 7 is a screen shot of the Tools drop-down menu 70, which the pouncer accesses to set up a pounce. As shown therein, the pouncer selects menu option "Buddy Pounce" 72, which in turn brings up a sub-menu displaying a single option 73, "New Pounce," that enables the pouncer to set up the desired pounce.

Figure 8:
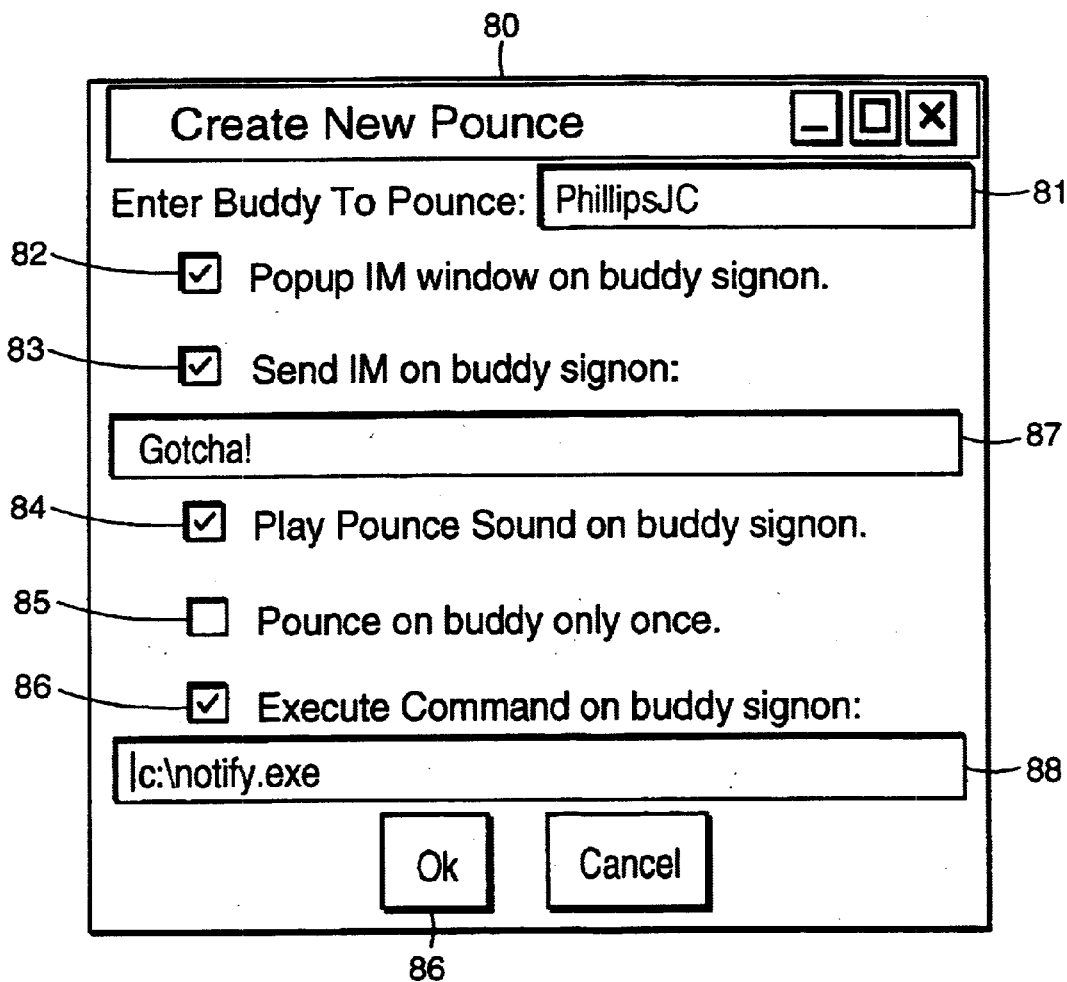
FIG. 8 is a screen shot of a "Create New Pounce" window.

FIG. 8 shows a "Create New Pounce" window 80 which is displayed on the pouncer's screen in response to selection of the "New Pounce" option 73. As shown in FIG. 8, the Create New Pounce window 80 includes a name field 81 into which the pouncer enters the name of the pouncee—i.e., the buddy who is the subject of the pounce. The window 80 also includes five check-boxes 82–86 that the pouncer can check or not to selectively activate five corresponding features.

If the pouncer checks box 82, a blank IM window 110 (FIG. 11) will pop up on the pouncer's screen when the pouncee signs on to the AIM system. Under this option, an IM is not sent automatically to the pouncee, but rather the IM interface window is merely instantiated to allow the pouncer to easily and quickly enter appropriate text and send an IM to the pouncee.

In contrast, if the pouncer checks box 83 in window 80 (FIG. 8), an IM will be sent to the pouncee automatically, and will pop up on the pouncee's screen, as soon as the pouncee signs on to AIM. This automatic sending of an IM is performed transparently as a consequence of the AIM system detecting the specified event (i.e., the pouncee's signing on) and without any input or response on the part of the pouncer beyond initially setting up the pounce. The particular text to be included in the IM sent to the pouncee— "Gotcha!"—is specified by the pouncer in message field 87.

Figure 9:
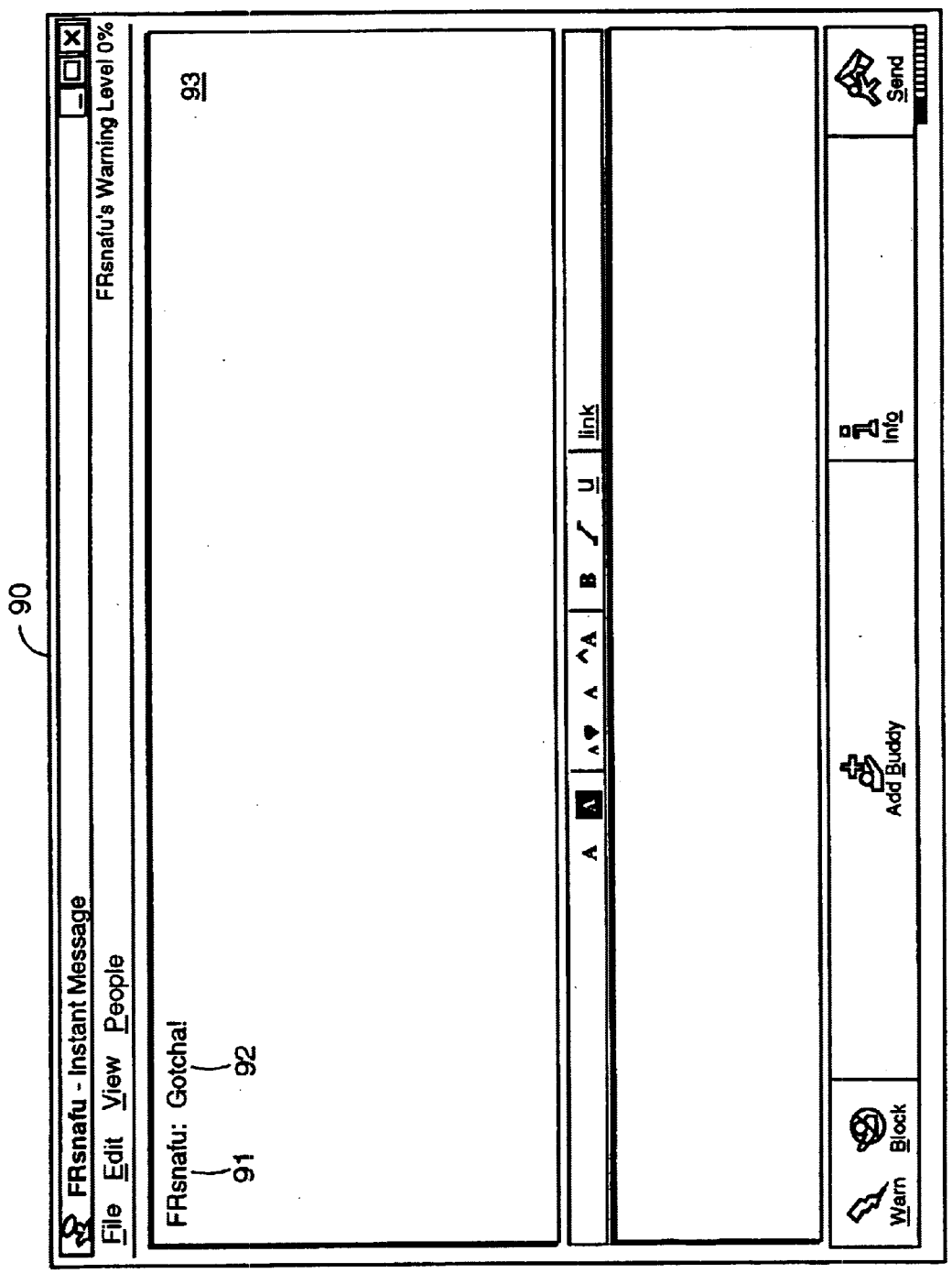
FIG. 9 is a screen shot of an instant message window corresponding to the Create New Pounce window of FIG. 8.

FIG. 9 is a screen shot of the Instant Message window 90 that pops up on the pouncee's window upon signing on to AIM. As shown, the window 90 includes a text display area 93 showing the identity 91 of the IM sender (i.e., the pouncer) and the message 92 ("Gotcha!") specified by the pouncer.

Figure 1:
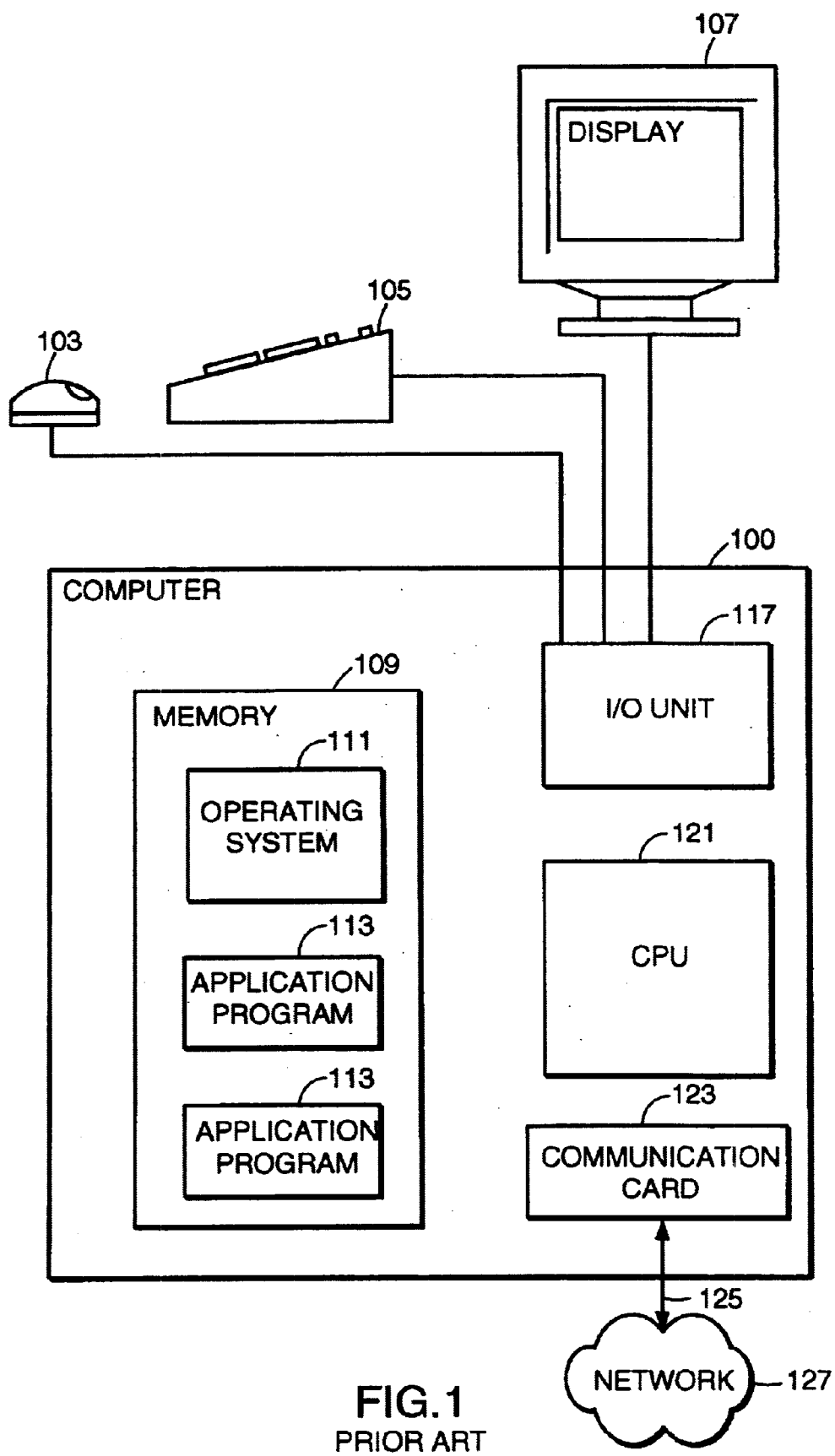
FIG. 1 is a block diagram of a computer system.
Figure 2:
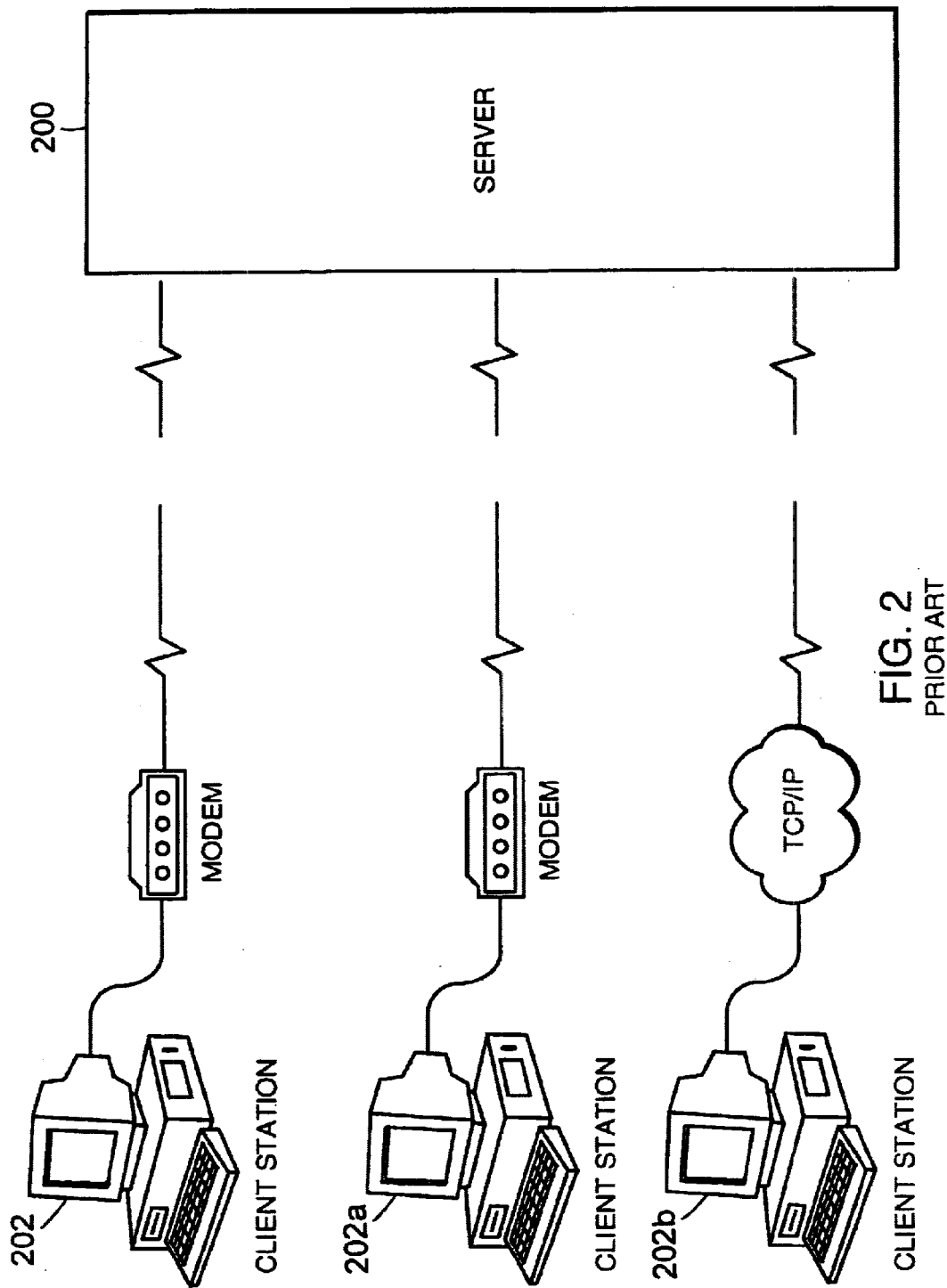
FIG. 2 shows a typical network computing environment.
Figure 3:
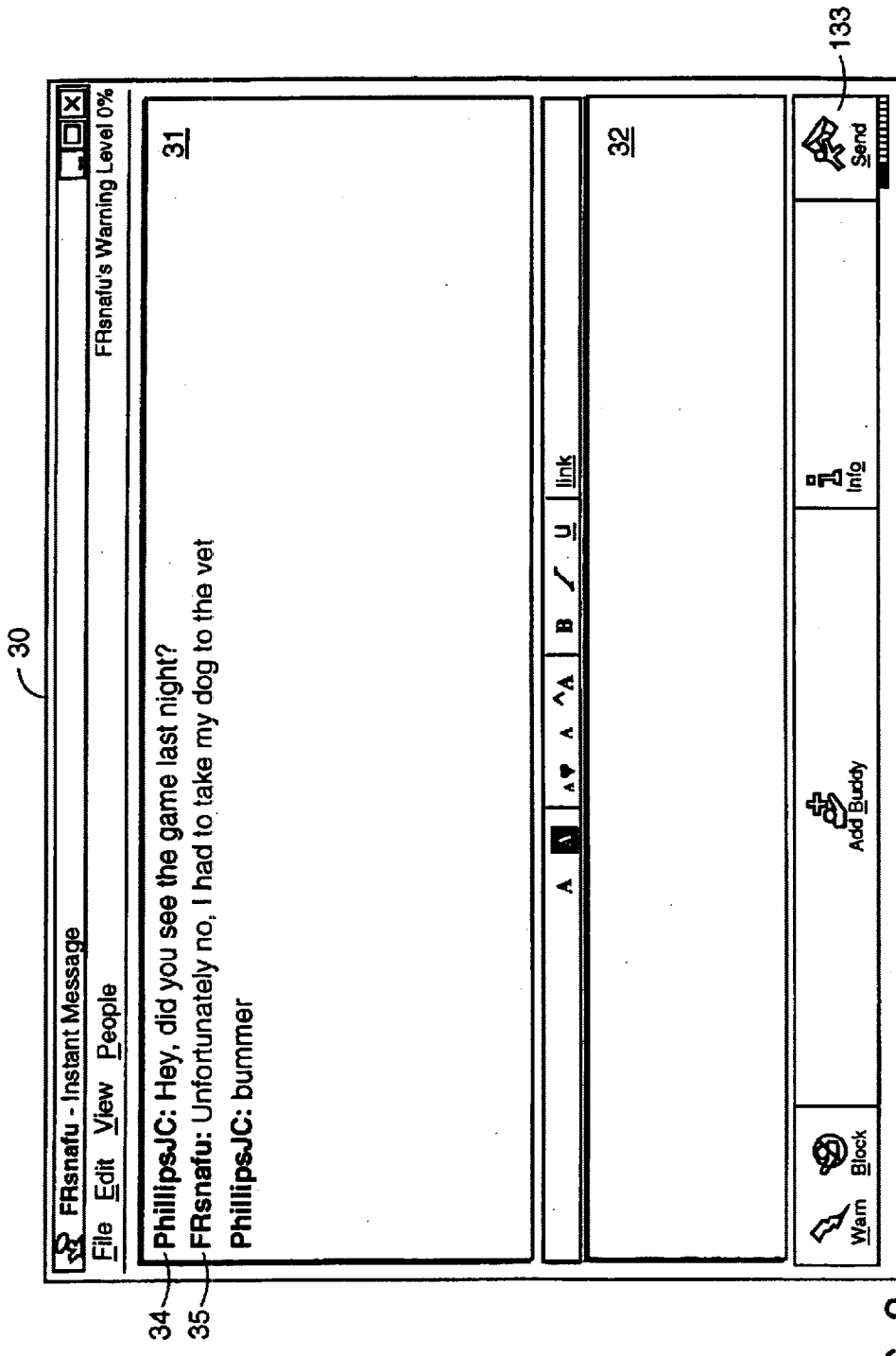
FIG. 3 is a screen shot of an "Instant Message" window.
Figure 4:
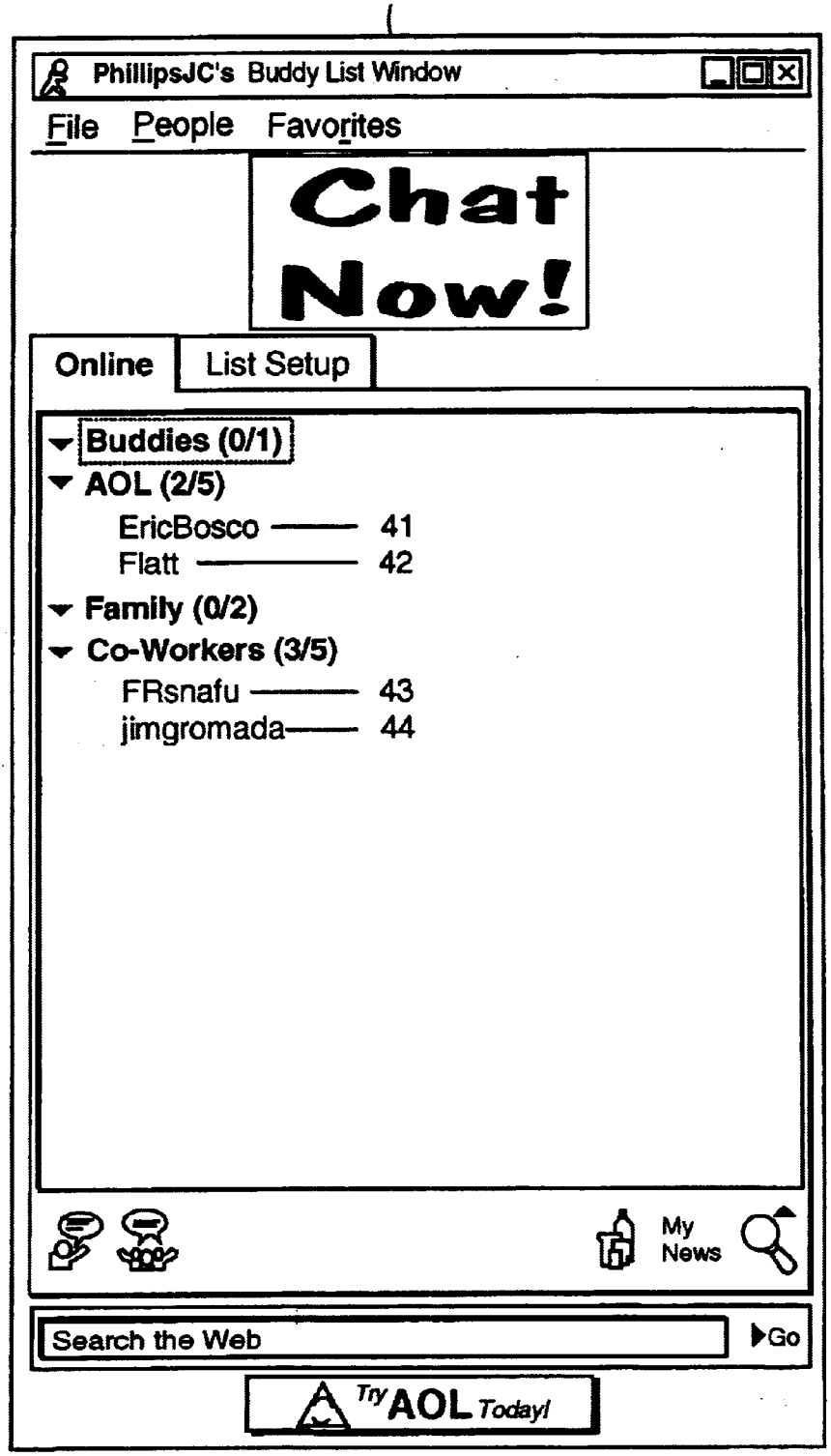
FIG. 4 is a screen shot of a "Buddy List" window in AOL's Instant Messenger for Windows.
Figure 10:
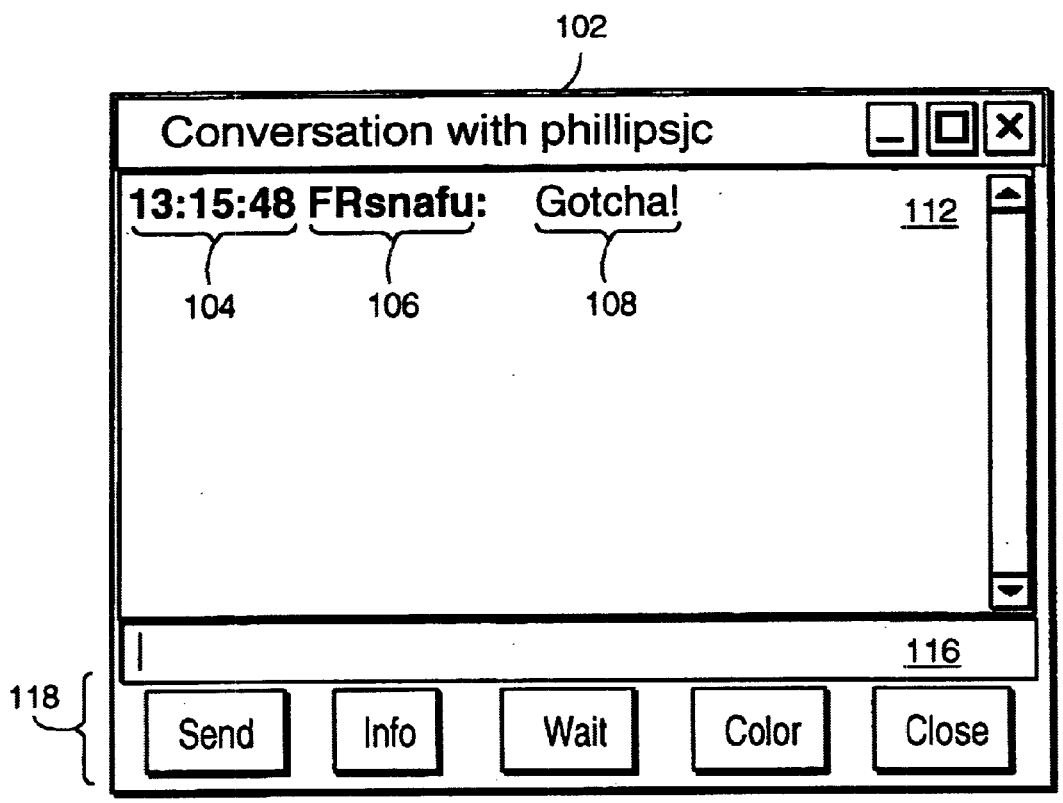
FIG. 10 is screen shot of a "Conversation" window.
Figure 11:
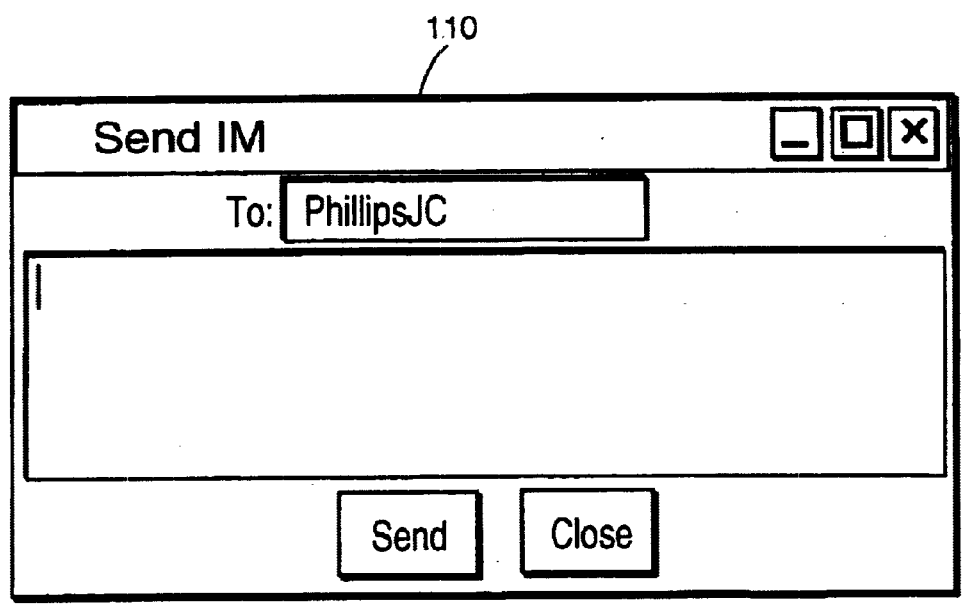
FIG. 11 is a screen shot of a "Send IM" window.

When the pouncer designates by checking box 83 (FIG. 8) that an IM should sent to the pouncee automatically, the Tik application also automatically instantiates a "Conversation" window 102 on the pouncer's client system, as shown in FIG. 10. Essentially, the Conversation window 102 fulfills the same function as the Instant Message window 30 shown in FIG. 3. Specifically, the Conversation window 102 includes a text display area 112, a text entry area 116, and buttons 118 to allow the user to control various aspects of the IM presentation and exchange. As shown in FIG. 10, the text display area 112 in window 102 includes a single line of text corresponding to the IM automatically sent to the pouncee upon execution of the pounce. This single line includes a time field 104 showing the time at which the IM was sent, a name field 106 showing the IM sender's identity, and a message field 108 showing the message.

Checking box 84 in window 80 (FIG. 8) causes a "Pounce Sound" (i.e., an audible notification) to be played on the pouncer's client system upon execution of the pounce. The Pounce Sound notifies the pouncer that the pouncee has signed on to the AIM system.

Box 85 in window 80 determines whether the pounce should be a single-shot or persistent. In the example shown, box 85 is unchecked so the pounce being set up in FIG. 8 will be persistent—that is, it will execute with each detection of a signon by the pouncee. In contrast, if box 85 was checked, the pounce would execute only once upon next detecting a signon by the pouncee and then would be deleted from the pounce queue.

By checking box 86 in window 80 (FIG. 8), the pouncer can specify a command (for example, a operating system command, a script, or an executable file) that is to be executed as part of the pounce execution. The particular command to be executed—in this example, an executable file at the path "c:\notify.exe" —is specified by the pouncer in text entry area 88 and can be virtually any command that is executable by the pouncer's client system. For example, the notify.exe command could send an IM to one or more third parties informing them that the pouncee has signed on. Alternatively, or in addition, notify.exe could launch another application (e.g., an online computer game to play with the pouncee) or initiate virtually any other arbitrarily-complex or arbitrarily-simple computer-controlled operation.

When the pouncer has set up the new pounce with the desired parameters, the pouncer clicks button 89 (FIG. 8) and the pounce is then saved in the queue of currently pending pounces.

Figure 12:
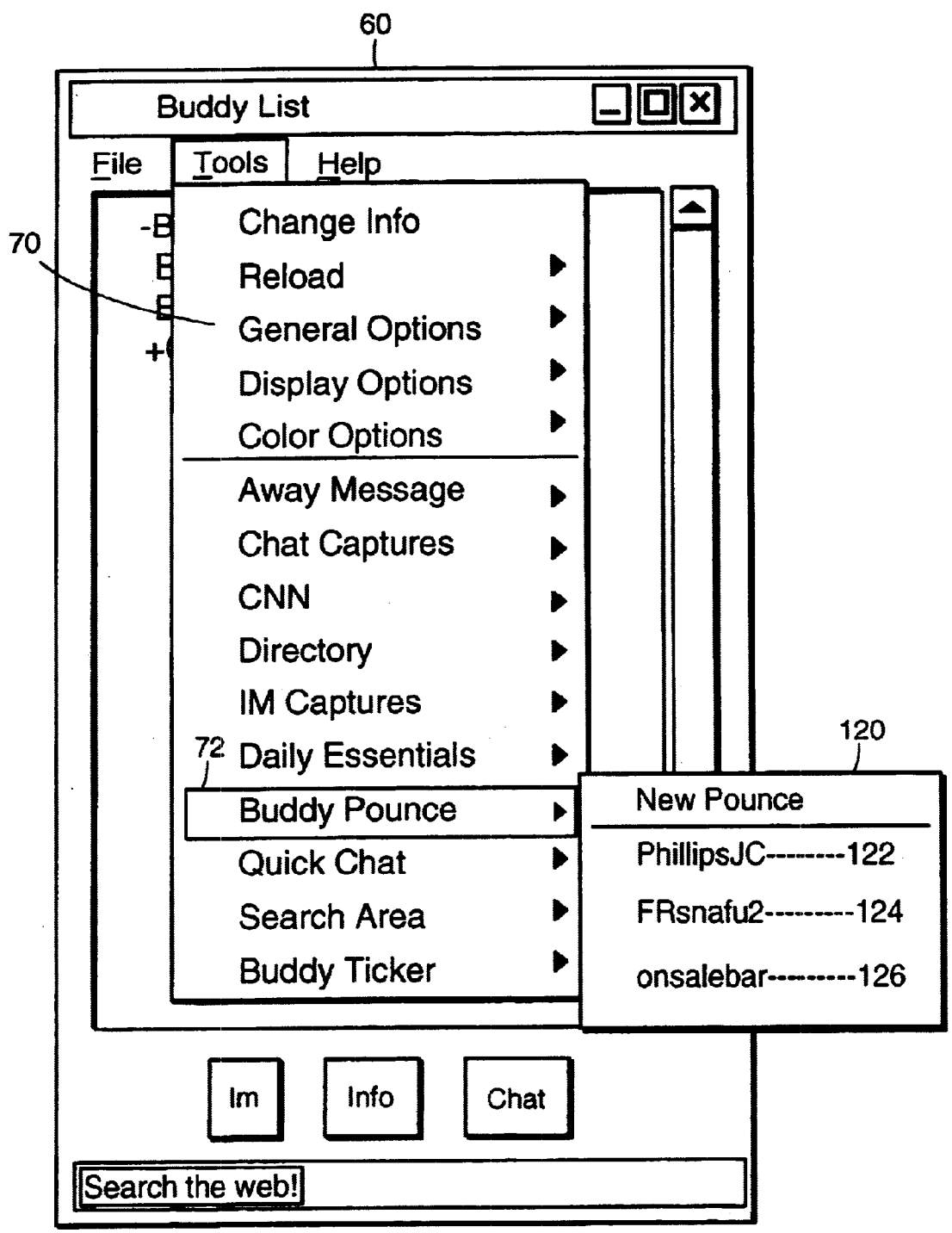
FIG. 12 is another screen shot of a "Tools" pull-down menu in the Buddy List window of FIG. 6.

As noted above, a single user can have more than one pounce pending in the queue at the same time. FIG. 12, for example, shows a Buddy List sub-menu 120 for a pouncer who has three pounces 122, 124 and 126 concurrently queued up and pending. Each of these pounces 122, 124, 126 is individually configurable as described above with regard to FIG. 8.

Figure 13:
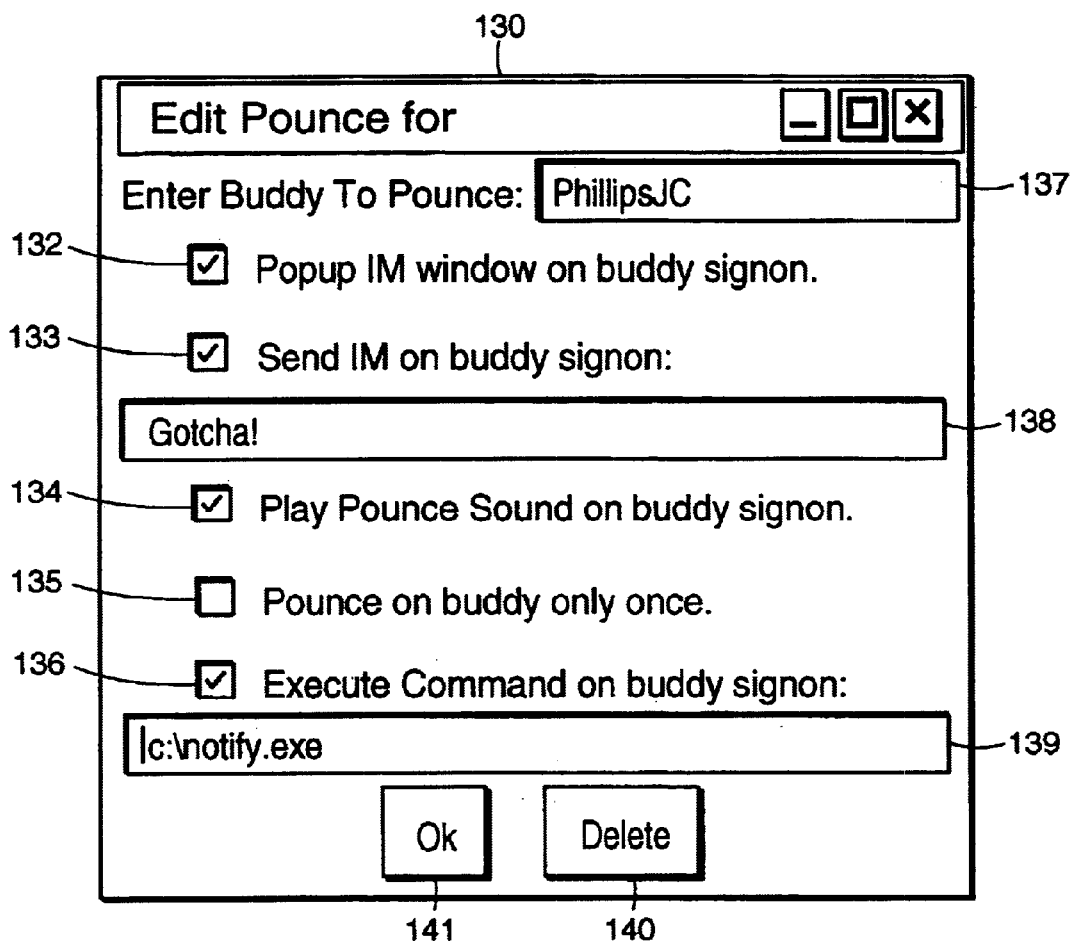
FIG. 13 is a screen shot of an "Edit Pounce" window.

Moreover, a queued pounce can be modified as desired by selecting it from the sub-menu 120, which in turn brings up an "Edit Pounce" window 130 as shown in FIG. 13. The Edit Pounce window 130 essentially is the same as the Create New Pounce window 80 shown in FIG. 8, except that the Edit Pounce window 130 is presented to the pouncer with the data fields and check boxes selectively filled in according to the pounce's current parameter set. The pouncer can modify any of these parameters by checking or unchecking boxes 132–136, and/or changing the text in fields 137–139. Once the pounce's parameters have been modified as desired, the pouncer can save the modified pounce in the queue by clicking the OK button 141. Alternatively, the pouncer can delete the pounce from the queue by clicking the Delete button 140.

The techniques, methods and systems described here may find applicability in any computing or processing environment in which monitoring other users and/or communicating with them is desirable. In particular, the concept of pouncing on another user could be applied to other media such as internet TV, cellular telephones, pagers, two-way radios, etc. For example, a cellular telephone service provider could implement a system in which a queued-up telephone call was completed as soon as the intended recipient turned on his or her cell phone.

Various implementations of the systems and techniques described here may be realized in digital electronic circuitry, or in computer hardware, firmware, software, or in combinations thereof. A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices.

Each computer program may be implemented in a high-level procedural or object-oriented programming language, or in assembly or machine language if desired; and in any case, the language may be a compiled or interpreted language. Suitable processors include, by way of example, both general and special purpose microprocessors.

Generally, a processor will receive instructions and data from a read-only memory and/or a random access memory. Storage devices suitable for tangibly embodying computer program instructions and data include all forms of non-volatile memory, including semiconductor memory devices, such as EPROM, EEPROM, and flash memory devices; magnetic disks such as internal hard disks and removable disks; magneto-optical disks; and CD-ROM disks.

Any of the foregoing may be supplemented by, or implemented in, specially-designed ASICs (application-specific integrated circuits).

A number of embodiments have been described. Nevertheless, it will be understood that various modifications may be made without departing from the spirit and scope of the invention. Accordingly, other embodiments are within the scope of the following claims.

What is claimed is:

1. A computer implemented method of monitoring users of a computer network, the method comprising:

receiving from a monitoring user a request to monitor the availability of a monitored user to receive messages;

detecting whether the monitored user is available; and executing a command based on whether the monitored user is available, the command being specified by the monitoring user and performing a function other than alerting the monitoring user of the availability of the monitored user, the command comprising an executable file, a scrip, or an operating system command.

2. The method of claim 1 wherein receiving the request includes receiving a request to monitor the availability of a previously unavailable user.

3. The method of claim 2 wherein the command is executed upon detecting that the previously unavailable user has become available.

4. The method of claim 1 further comprising automatically sending a predetermined message to the monitored user based on whether the monitored user is available.

5. The method of claim 4 further comprising repeating the detecting, executing, and automatic sending each time the monitored user newly becomes available.

6. The method of claim 1 wherein the detecting and executing are performed entirely on one or more server systems.

7. The method of claim 1 wherein the detecting and executing are performed entirely on one or more client systems.

8. The method of claim 1 wherein the detecting and executing are distributed among one or more server systems and one or more client systems.

9. The method of claim 1 further comprising repeating the detecting and executing each time the monitored user newly becomes available.

10. The method of claim 1 wherein the monitoring user is an operator of a computer who is interested in understanding the availability of the monitored user to receive messages.

11. The computer system of claim 1 wherein the monitoring user is an operator of a computer who is interested in understanding the availability of the monitored user to receive messages.

12. The method of claim 1 wherein executing a command comprises executing a command that launches an online computer game to play with the monitored user.

13. The method of claim 1 wherein executing a command comprises executing a command not directed to monitoring online status.

14. The method of claim 1 wherein executing a command comprises executing a command that sends to the monitored user a message from the monitoring user.

15. The method of claim 1 wherein executing a command comprises executing a command that displays to the monitored user a message from the monitoring user.

16. The method of claim 15 wherein displaying a message comprises visually displaying a message to the monitored user.

17. The method of claim 15 wherein the message comprises an instant message sent by the monitoring user to the monitored user.

18. The method of claim 17 wherein the instant message is sent to only the monitored user.

19. A computer system including a computer program for monitoring users of a computer network, the computer program including code segments structured and arranged to:
    receive from a monitoring user a request to monitor the availability of a monitored user to receive messages;
    detect whether the monitored user is available; and
    execute a command based on whether the monitored user is available, the command being specified by the monitoring user and performing a function other than alerting the monitoring user of the availability of the monitored user, and comprising an executable file, a script, or an operating system command.

20. The computer system of claim 19 wherein the receiving code segment includes a code segment for receiving a request to monitor the availability of a previously unavailable user.

21. The computer system of claim 20 wherein the executing code segment includes a code segment for executing the command upon detecting that the previously unavailable user has become available.

22. The computer system of claim 19 further comprising a code segment for automatically sending a predetermined message to the monitored user based on whether the monitored user is available.

23. The computer system of claim 22 further comprising a code segment for repeating the detecting, executing, and automatic sending each time the monitored user newly becomes available.

24. The computer system of claim 19 wherein the code segments for detecting and executing are located entirely on one or more server systems.

25. The computer system of claim 19 wherein the code segments for detecting and executing are located entirely on one or more client systems.

26. The computer system of claim 19 wherein the code segments for detecting and executing are distributed among one or more server systems and one or more client systems.

27. The computer system of claim 19 further comprising a code segment for repeating the detecting and executing each time the monitored user newly becomes available.

28. The system of claim 19 wherein the execute a command code segment comprises a code segment structured and arranged to launch an online computer game to play with the monitored user.

29. The system of claim 19 wherein the execute a command code segment comprises a code segment structured and arranged to execute a command not directed to monitoring online status.

30. The system of claim 19 wherein the execute a command code segment comprises a code segment structured and arranged to send to the monitored user a message from the monitoring user.

31. The system of claim 19 wherein the execute a command code segment comprises a code segment structured and arranged to display to the monitored user a message from the monitoring user.

32. The system of claim 31 wherein the execute a command code segment is structured and arranged to visually display a message to the monitored user.

33. The system of claim 31 wherein the message comprises an instant message sent by the monitoring user to the monitored user.

34. The system of claim 33 wherein the instant message is sent to only the monitored user.

35. An apparatus for monitoring users of a computer network, the apparatus comprising:
    means for receiving from a monitoring user a request to monitor the availability of a monitored user to receive messages;
    means for detecting whether the monitored user is available; and
    means for executing a command based on whether the monitored user is available, the command being specified by the monitoring user and performing a function other than alerting the monitoring user of the availability of the monitored user, and comprising an executable file, a script, or an operating system command.

* * * * *